(12) United States Patent
Trnetschek et al.

(10) Patent No.: US 7,214,645 B2
(45) Date of Patent: May 8, 2007

(54) PRODUCTION OF ACTIVATED CARBON EXHIBITING AN ELEVATED CATALYTIC ACTIVITY

(75) Inventors: Steffan Trnetschek, Gefrees (DE); Gabriele Busse, Ködnitz/Fölschnitz (DE); Eberhard Sachmann, Premnitz (DE)

(73) Assignee: Helsa Automotive GmbH & Co. KG, Gefrees (DE)

( * ) Notice: Subject to any disclaimer, the term of this patent is extended or adjusted under 35 U.S.C. 154(b) by 533 days.

(21) Appl. No.: 10/297,547

(22) PCT Filed: Jun. 1, 2001

(86) PCT No.: PCT/DE01/02087

§ 371 (c)(1),
(2), (4) Date: Dec. 6, 2002

(87) PCT Pub. No.: WO01/94261

PCT Pub. Date: Dec. 13, 2001

(65) Prior Publication Data

US 2003/0153458 A1    Aug. 14, 2003

(30) Foreign Application Priority Data

Jun. 9, 2000    (DE) ................ 100 28 654

(51) Int. Cl.
*C01B 31/08* (2006.01)
(52) U.S. Cl. .................................... 502/416
(58) Field of Classification Search ........... 502/416; 423/460
See application file for complete search history.

(56) References Cited

U.S. PATENT DOCUMENTS

| 4,212,852 A * | 7/1980 | Aibe et al. ............ 423/230 |
| 4,362,646 A | 12/1982 | Ikegami et al. |
| 4,957,897 A | 9/1990 | Maroldo et al. ........ 502/432 |
| 5,352,370 A | 10/1994 | Hayden |
| 5,356,849 A | 10/1994 | Matviya et al. |
| 5,444,031 A | 8/1995 | Hayden |
| 5,700,436 A | 12/1997 | Doughty et al. |
| 6,114,273 A | 9/2000 | Hayden |

FOREIGN PATENT DOCUMENTS

| CN | 1250117 | 4/2000 |
| DE | 78562 | 12/1970 |
| DE | 2419827 | 11/1974 |
| DE | 139067 | 12/1979 |
| DE | 2352790 C3 | 4/1989 |
| DE | 3801457 A1 | 8/1989 |
| DE | 3932122 A1 | 4/1990 |
| EP | 0162035 A2 | 11/1985 |
| EP | 0649815 | 4/1995 |
| GB | 1457819 | 8/1976 |
| JP | 54135694 A | 10/1979 |
| JP | 55007534 A | 1/1980 |
| JP | 57106516 A | 7/1982 |
| JP | 60167927 A | 8/1985 |
| WO | WO94/16814 | 8/1994 |
| WO | WO 95/33556 | 12/1995 |
| WO | WO99/21827 | 5/1999 |
| WO | WO99/36395 | 7/1999 |
| WO | WO99/58240 | 11/1999 |

OTHER PUBLICATIONS

John B. Tomlinson, John J. Freeman, Charis R. Theocharis, "The Preparation and Adsorptive Properties of Ammonia-Activated Viscose Rayon Chars", Carbon, 31(1):13-20(1993).
H.v. Kienle, E. Bäder, Aktivkohle und ihre industrielle Anwendung, Ferdinand Enke Verlag Stuttgart, Vorwort, Inhaltsverzeichnis sowie Seiten 31 bis 37 (1980), in German.

* cited by examiner

*Primary Examiner*—Stuart Hendrickson
(74) *Attorney, Agent, or Firm*—Hoffmann & Baron, LLP

(57) ABSTRACT

Proposed is a process for producing active carbon with increased catalytic activity, wherein the process starts from an active carbon substrate which in particular is an active carbon substrate based on a carbon-bearing cokable raw material, and includes heating of the active carbon substrate to the activation temperature by contacting it with a reaction gas mixture and cooling of the active carbon substrate which is activated in that way.

16 Claims, No Drawings

PRODUCTION OF ACTIVATED CARBON EXHIBITING AN ELEVATED CATALYTIC ACTIVITY

The present invention concerns a process for producing active carbon with increased catalytic activity, wherein the process starts from an active carbon substrate. In particular the process according to the invention starts from an active carbon substrate based on carbon-bearing cokable raw materials.

Active carbon with an increased catalytic activity has been a matter of particular interest in various areas for some time. Active carbon with an increased activity for $SO_2$ is of great significance for use for keeping air clean, in particular in thin-layer filters, as it adsorption-catalytically converts $SO_2$ into sulfuric acid in moist air and adsorbs same. In that respect the catalytic activity is to be attributed to the nitrogen component in the active carbon, in which case a controlled introduction of nitrogen into the active carbon during the production thereof has proven to be advantageous, in comparison with the use of nitrogen-rich starting materials.

U.S. Pat. Nos. 5,352,370, 5,356,849 and 5,444,031 disclose for example processes which start from a fat or pit coal which is subjected to low-temperature carbonization and oxidation, followed by contacting with a small amount of a nitrogen-bearing compound such as for example urea, during the then subsequent calcination and condensation of the carbon structure. That calcination operation is effected at temperatures of between 850 and 950° C. and is carried out in an inert atmosphere. The nitrogen-treated high-temperature coals are then activated to a desired density at temperatures above 700° C. in water vapor or carbon dioxide without the further addition of auxiliary agents such as for example air. The calcined and activated carbon is finally cooled in an oxygen-free atmosphere to temperatures of below 400° C., in which respect cooling to below 200° C. is also disclosed. Lignocellulose materials are mentioned generally as starting materials for the production of the initial active carbon, without those publications involving a more detailed description or discussion of the use of those materials.

The catalytic reaction of $H_2S$, $SO_x$, $NO_x$, peroxides and/or chloramines in liquid and/or gaseous media is referred to as an area of use for the catalytically operative active carbons described in the above-indicated state of the art.

DE 23 52 790 C3 discloses a process for the removal of sulfur oxides and/or nitrogen oxides from exhaust gases, using activated or post-treated active carbon. That post-treated active carbon was produced by contacting active carbon which according to the disclosure was produced from materials such as charcoal, coke, coconut shells and so forth, with gaseous ammonia, under the effect of heat. It is disclosed in that respect that the ammonia is used in a mixture in an inert carrier gas such as for example nitrogen or flue gas. In that procedure the proportion of inert gas is in the range of between 0 and about 90% by volume with respect to the gaseous ammonia. The presence of other gases which are significant for activation is not disclosed.

The object of the present invention is to enhance the state of the art at least by a further process for producing active carbon with increased catalytic activity, in particular a process for producing active carbon with increased catalytic activity for $SO_2$. A further object of the present invention is to provide a process in which as few process steps as possible are required for the production of active carbon with increased catalytic activity, the invention aiming to provide that the process should as far as possible result in a defined product and can be implemented particularly economically.

According to the invention the present object is attained by a process as set forth in accompanying claim 1. An alternative way of attaining that object is the subject-matter of claim 2. Advantageous embodiments of the process are the subject-matter of dependant claims 3 through 22.

The process according to the invention is particular advantageous because basically it consists of a single process step comprising three sub-steps which blend continuously into each other. That is already a marked simplification in relation to the processes which are known from the state of the art and in which nitrogen enrichment in the active carbon and the activation procedure are implemented in two process steps which are markedly separate from each other.

This is possible by virtue of the use according to the invention of a reaction gas mixture for activation and increasing the nitrogen proportion in the active carbon, which at the same time contains $NH_3$ and $CO_2$ and/or $H_2O$. After the increase in the nitrogen proportion in the active carbon has been effected, with simultaneous activation thereof, finally only cooling of the activated active carbon substrate is still required, which is generally implemented in the atmosphere of the above-mentioned reaction gas mixture or under inert conditions.

In an alternative configuration of the process according to the invention the active carbon substrate to be activated is impregnated with ammonia water so that activation is effected with the metered addition of $CO_2$ and/or $H_2O$. This alternative form of the process advantageously provides that a metered addition of gaseous ammonia is redundant and only a slight introduction of steam or water is also required. That considerably reduces the level of complication and expenditure in terms of process engineering.

Both processes can be carried out without any problem in an electrically heated furnace. In a development of the present invention both alternative forms of the process provide for support heating in the furnace, which is achieved by a gas burning arrangement. As such combustion is effected with air, $N_2$ is still contained in the reaction gas mixture by virtue of the normal proportion of nitrogen in the air.

In a particular configuration of the process according to the invention the heating operation is effected by introducing the active carbon substrate into a reactor which is preheated to activation temperature. It is self-apparent in that respect that the active carbon substrate, as moreover throughout the entire duration of the process, is sufficiently moved to ensure uniform contacting of the active carbon substrate with the gas phase and the reactor walls which transfer the required heat. In the investigations which were carried out in the scope of and for the purposes of checking the present invention, it was surprisingly found that, presupposing the usual agitation of the active carbon substrate, a heating rate is set which does not require any expensive regulation and particular checking procedure. In spite of this unexpected simplification in terms of carrying out the process the active carbon produced in accordance with the invention, with increased catalytic activity, is convincing by virtue of its particular catalytic properties.

In accordance with the invention the activation temperature is between 800 and 970° C. as the increase in the proportion of nitrogen and activation of the active carbon substrate with the reaction gas mixture according to the invention in that temperature range generally results in active carbons with particularly advantageous catalytic and adsorption properties. A temperature range of between 880 and 970° C. is particularly preferred in that respect.

In a particular configuration of the process according to the invention the gas mixture used for activation of the heated active carbon substrate contains between 1 and 20% by volume of $NH_3$, between 10 and 60% by volume of $H_2O$ and between 5 and 50% by volume of $CO_2$, wherein between 1 and 10% by volume of $NH_3$, between 10 and 30% by volume of $H_2O$ and between 5 and 15% by volume of $CO_2$ are preferred. The balance is nitrogen. Activation is generally effected over a period of between 30 and 90 minutes, in particular over a period of between 45 and 75 minutes. Activation is generally carried out until reaching the desired catalytic activity for $SO_2$ or until the reaction for producing an active carbon product with the desired porosity is reached.

In a particularly preferred configuration of the process according to the invention the active carbon substrate used is an active carbon produced from coconut shells. It is precisely coconut shell-based active carbon that is particularly suitable for the production of active carbon with an increased catalytic activity as it already has from the outset an extremely advantageous pore structure, which surprisingly has a particularly advantageous effect on the increase in the proportion of nitrogen and thus on the level of catalytic activity as well as the adsorptive properties of the product of the process. At the same time that starting material can be commercially obtained in a sufficient amount and inexpensively, with a uniform quality.

Finally it is preferred if the operation of cooling the activated active carbon substrate is carried out to a temperature <200° C. In the reaction gas atmosphere this ensures that no unwanted change in the activated active carbon substrate occurs by virtue of the oxygen in the air. In addition at a temperature <200° C. the activated active carbon substrate can also be removed without any problem from the reactor being used and passed to intermediate storage or for further processing without the need for particular precautions in terms of temperature resistance of the containers and items of equipment which come into contact with the product of the process.

The process according to the invention which has been generally described hereinbefore is described in greater detail hereinafter by means of embodiments.

In the examples described hereinafter, 350 g of active carbon which had been produced from coconut shells was introduced in each case into a metal tube of a diameter of 90 mm and a length of 600 mm. Thereafter the tube was then introduced horizontally into a tubular furnace heated to activation temperature, the temperature being kept constant during the operation of heating the active carbon in the tube. The tube was turned at a speed of about 6 revolutions per minute. After the active carbon had been brought to activation temperature, the gas used to increase the catalytic activity and for activation was passed through the tube and over the active carbon, the tube being removed from the tube furnace together with the active carbon after the expiry of 60 minutes. The product of the process was then cooled in an $N_2$ atmosphere to a temperature <200° C. Finally the tube was emptied and the active carbon obtained and treated in that way was subjected to suitable analysis.

The analytical data of the starting material used as the active carbon substrate, based on coconut shells, are as follows:

| | |
|---|---|
| iodine value | 670 mg/g |
| specific area in accordance with $N_2$-adsorption | 620 m²/g |
| micropore volume in accordance with $N_2$-adsorption | 0.272 cm³/g |
| $H_2O_2$-decomposition | |
| Δ T after 5 min. | 1.1K |
| Δ T after 10 min. | 1.8K |
| thin-layer bed (2 mm) $SO_2$-breakthrough | |
| after 5 min. | 67% |
| after 10 min. | 80% |
| after 15 min. | 87% |
| reacted $SO_2$ amount | 7 mg/g |
| nitrogen content | 0.08% |

EXAMPLE 1

An active carbon substrate was treated in accordance with the foregoing information. A combination of $NH_3$, $CO_2$ and $H_2O$ is used as the gas mixture. The gas mixture is obtained by heating a 25% ammonia solution with the simultaneous introduction of $CO_2$ gas. The activation temperature is in a range of between 900 and 920° C.

The firing loss of the carbon of the active carbon is a maximum of 16%. By virtue of the change in the surface structure of the active carbon due to the incorporation of nitrogen, wherein the nitrogen content of the active carbon rises from about 0.080% to between 0.3 and 0.4% and the increased firing loss, an increase in the specific surface area, micropore volume, iodine value, reactivity and the adsorption capacity for $SO_2$ and for n-butane and toluene is achieved.

The above-specified gas mixture was passed through at the following rate: 36 l/h of $NH_3$, 102 l/h of $H_2O$ and 70 l/h of $CO_2$, which results in an overall gas amount of 208 l/h. As a percentage the gas mixture used is composed of 17% by volume of $NH_3$, 49% by volume of $H_2O$ and 34% by volume of $CO_2$.

After cooling the process product had the following properties:

| | |
|---|---|
| iodine value | 1130 mg/g |
| specific area in accordance with $N_2$-adsorption | 960 m²/g |
| micropore volume in accordance with $N_2$-adsorption | 0.246 cm³/g |
| $H_2O_2$-decomposition | |
| Δ T after 5 min. | 19.0K |
| Δ T after 10 min. | 23.2K |
| thin-layer bed (2 mm) $SO_2$-breakthrough | |
| after 5 min. | 15% |
| after 10 min. | 17% |
| after 15 min. | 19% |
| reacted $SO_2$ amount | 38 mg/g |

EXAMPLE 2

The procedure used was precisely as in Example 1, except that the gas mixture was passed through at the following rate: 30 l/h of $NH_3$, 85 l/h of $H_2O$ and 70 l/h of $CO_2$, which resulted in an overall gas amount of 185 l/h. As a percentage the gas mixture used in this Example was composed of 16% by volume of $NH_3$, 46% by volume of $H_2O$ and 38% by volume of $CO_2$.

The process product obtained in that way had the properties set out hereinafter:

| | |
|---|---|
| iodine value | 1040 mg/g |
| specific area in accordance with $N_2$-adsorption | 930 m²/g |
| micropore volume in accordance with $N_2$-adsorption | 0.377 cm³/g |
| $H_2O_2$-decomposition | |
| Δ T after 5 min. | 17.5K |
| Δ T after 10 min. | 21.5K |
| thin-layer bed (2 mm) $SO_2$-breakthrough | |
| after 5 min. | 12% |
| after 10 min. | 15% |
| after 15 min. | 17% |
| reacted $SO_2$ amount | 39 mg/g |

EXAMPLE 3

This Example was also executed as in Example 1, except that the gas mixture was passed through at the following rate: 24 l/h of $NH_3$, 68 l/h of $H_2O$ and 70 l/h of $CO_2$, which resulted in an overall gas amount of 162 l/h. As a percentage the gas mixture used in this Example was composed of 15% by volume of $NH_3$, 42% by volume of $H_2O$ and 42% by volume of $CO_2$.

The process product obtained in that way had the properties set out hereinafter:

| | |
|---|---|
| iodine value | 1050 mg/g |
| specific area in accordance with $N_2$-adsorption | 840 m²/g |
| micropore volume in accordance with $N_2$-adsorption | 0.349 cm³/g |
| $H_2O_2$-decomposition | |
| Δ T after 5 min. | 17.1K |
| Δ T after 10 min. | 20.5K |
| thin-layer bed (2 mm) $SO_2$-breakthrough | |
| after 5 min. | 14% |
| after 10 min. | 16% |
| after 15 min. | 18% |
| reacted $SO_2$ amount | 37 mg/g |

EXAMPLE 4

Execution of this Example involved using a gas mixture in accordance with Example 1, but the activation temperature was between 830 and 850° C.

The process product obtained in that way had the properties set out hereinafter:

| | |
|---|---|
| iodine value | 1100 mg/g |
| specific area in accordance with $N_2$-adsorption | 890 m²/g |
| micropore volume in accordance with $N_2$-adsorption | 0.380 cm³/g |
| $H_2O_2$-decomposition | |
| Δ T after 5 min. | 15.4K |
| Δ T after 10 min. | 21.1K |
| thin-layer bed (2 mm) $SO_2$-breakthrough | |
| after 5 min. | 50% |
| after 10 min. | 60% |
| after 15 min. | 70% |
| reacted $SO_2$ amount | 16 mg/g |

EXAMPLE 5

Execution of this Example also involved using a gas mixture in accordance with Example 1, but in contrast the activation temperature was set at between 880 and 900° C.

The process product obtained under these conditions was of the following properties:

| | |
|---|---|
| iodine value | 1130 mg/g |
| specific area in accordance with $N_2$-adsorption | 960 m²/g |
| micropore volume in accordance with $N_2$-adsorption | 0.246 cm³/g |
| $H_2O_2$-decomposition | |
| Δ T after 5 min. | 18.1K |
| Δ T after 10 min. | 22.6K |
| thin-layer bed (2 mm) $SO_2$-breakthrough | |
| after 5 min. | 15% |
| after 10 min. | 17% |
| after 15 min. | 19% |
| reacted $SO_2$ amount | 38 mg/g |

EXAMPLE 6

This Example also involved using a gas mixture in accordance with Example 1. The activation temperature set however was between 930 and 950° C.

The process product obtained under these conditions was of the following properties:

| | |
|---|---|
| iodine value | 1110 mg/g |
| specific area in accordance with $N_2$-adsorption | 1080 m²/g |
| micropore volume in accordance with $N_2$-adsorption | 0.377 cm³/g |
| $H_2O_2$-decomposition | |
| Δ T after 5 min. | 16.6K |
| Δ T after 10 min. | 21.3K |
| thin-layer bed (2 mm) $SO_2$-breakthrough | |
| after 5 min. | 17% |
| after 10 min. | 18% |
| after 15 min. | 20% |
| reacted $SO_2$ amount | 37 mg/g |

EXAMPLES 7 AND 8

Examples 7 and 8 were carried out on a technical scale and continuously. In the continuous process for post-activation of coconut shell active carbon active carbon and reaction gas are passed in co-flow relationship. In this case the reaction gases are produced by direct combustion of natural gas in a rotary tube furnace and by a feed of ammonia gas and water vapor. In this procedure the ammonia gas is supplied with the active carbon while the water vapor is additionally injected into the reaction space. In Example 7 activation is effected with $NH_3$ and $H_2O$ while Example 8 only involves the use of $H_2O$.

In practice the rotary tube furnace is pre-heated with natural gas to a temperature of about 920° C. and thereafter the carbon is meteredly introduced jointly with the ammonia gas. Transportation of the active carbon through the furnace is effected by the rotation of the tube which is inclined towards the discharge. The active carbon which has passed through the procedure according to the invention is discharged by way of a pipe coil and simultaneously cooled to a temperature <200° C. The process conditions were as follows:

| for Example 7 | |
|---|---|
| amount of active carbon | 35 kg/h |
| temperature (burner regulation) | between 900 and 920° C. |
| ammonia gas | between 2 and 5 m³ of $N_3$/h |
| $H_2O$ vapor | 16 kg/h |
| reduced pressure | <2 mm water column |
| circulatory speed | 100 sec/revolution |
| for Example 8 | |
| amount of active carbon | 35 kg/h |
| temperature (burner regulation) | between 900 and 920° C. |
| $H_2O$ vapor | 16 kg/h |
| reduced pressure | <2 mm water column |
| circulatory speed | 100 sec/revolution |

The process products produced in Examples 7 and 8 exhibited the following properties:

| | Example 7 | Example 8 |
|---|---|---|
| iodine value | 980 mg/g | 990 mg/g |
| specific area in accordance with $N_2$-adsorption | 850 m²/g | 820 m²/g |
| micropore volume in accordance with $N_2$-adsorption | 0.346 cm³/g | 0.361 cm³/g |
| $H_2O_2$-decomposition | | |
| Δ T after 5 min. | 11.5K | 2.2K |
| Δ T after 10 min. | 16.4K | 3.5K |
| nitrogen content | 0.35% | 0.1% |
| thin-layer bed (2 mm) adsorption of n-butane (80 ppm) | 41 mg/g | 43 mg/g |
| thin-layer bed (2 mm) adsorption of toluene (80 ppm) | 41 mg/g | 43 mg/g |
| breakthrough after 5 min. | 4% | 18% |
| capacity | 250 mg/g | 250 mg/g |
| thin-layer bed (2 mm) $SO_2$-breakthrough | | |
| after 15 min. | 14% | 53% |
| after 10 min. | 16% | 66% |
| after 15 min. | 17% | 78% |
| reacted $SO_2$ amount | 38 mg/g | 12 mg/g |

EXAMPLE 9

In a further technical experiment the carbon was saturated prior to the activation procedure with $NH_3$-water (250%) and introduced into the reactor.

In this case, at the beginning of the rotary tube furnace, besides the saturated carbon, only the natural gas is also added. Water vapor is added at the center of the reactor or after half the reaction time.

| amount of active carbon | 50 kg/h |
|---|---|
| temperature | between 900 and 920° C. |
| $NH_3$-water | 0.3 l/kg/17 l/h |
| $H_2O$ vapor | between 20 and 40 kg/h |

Before the addition of the $H_2O$ vapor an intermediate sample 9a was drawn, the end product was identified by 9b. Examples 9a and 9b exhibited the following properties:

| | Example 9a | Example 9b |
|---|---|---|
| iodine value | 940 mg/g | 1070 mg/g |
| $H_2O_2$-decomposition | | |
| Δ T after 5 min. | 25 K | 28 K |
| Δ T after 10 min. | 35 K | 40 K |
| thin-layer bed (2 mm) $SO_2$-breakthrough | | |
| after 5 min. | 30% | 18% |
| after 10 min. | 38% | 25% |
| after 15 min. | 40% | 28% |
| reacted $SO_2$ amount | 30 mg/g | 37 mg/g |

It can be seen beyond doubt from the above-described Examples that the process according to the invention surprisingly very easily makes it possible to produce active carbon with increased catalytic activity. In particular, when comparing the properties of the active carbons with increased catalytic activity, produced in Examples 1 through 6, to those of the active carbon substrate used as the starting material, it is found that the use of a reaction gas mixture which contains $NH_3$, $CO_2$ and $H_2O$ and optionally $N_2$, leads to particularly good results in activating and increasing the nitrogen component. The present situation in particular also involves a process which is very simple in terms of process engineering as the active carbon substrate used as the starting material only has to be introduced into a reactor, heated and mixed with the gas mixture.

Surprisingly it was also found that the active carbons produced in Examples 2 and 3 have a markedly improved adsorption performance in respect of n-butane and toluene, over the active carbon substrate used as the starting material. The values in that respect are set forth hereinafter:

| | Active carbon substrate | Example 2 | Example 3 |
|---|---|---|---|
| thin-layer bed (2 mm) adsorption performance for n-butane | | | |
| immediate breakthrough | 30.5% | 2.6% | 9.8% |
| capacity thin-layer bed (2 mm) | 19 mg/g | 37 mg/g | 34 mg/g |

-continued

|  | Active carbon substrate | Example 2 | Example 3 |
|---|---|---|---|
| adsorption performance for toluene |  |  |  |
| breakthrough after 5 min. | 30.2% | 7.6% | 6.2% |
| capacity | 130 mg/g | 260 mg/g | 230 mg/g |

It becomes particularly clear in this respect that the gas composition according to the invention is the cause of the particular properties of the active carbon produced by the process according to the invention.

In Examples 4 through 6, the influence of temperature on the properties of the product of the process has been investigated more closely, and it has been found that the best process results are achieved in a temperature range of between 880 and 950° C.

Examples 7, 8 and 9 serve to clearly illustrate technical implementation of the process in a rotary tube furnace. The properties achieved in that respect in the products of the process are economically readily meaningful and useable so that this provides a process which can already be used without further adaptation on a commercial scale.

To sum up it is to be noted that the process according to the invention already affords particular advantages over processes from the state of the art by virtue of the reduction in the complication and expenditure in terms of process engineering—basically only one reaction step is still required. In this respect the process remains thoroughly variable and can be adapted to the respective demands made in terms for example of activity of the active carbon or the nature of the starting material used, without involving particular complication and expenditure.

The invention claimed is:

1. A process for producing active carbon with increased catalytic activity, said process comprising the following process steps:
   providing an active carbon substrate,
   heating the active carbon substrate to an activation temperature of 800 to 970° C. by contacting it with a reaction gas mixture which contains $NH_3$ and at least one of $CO_2$ and $H_2O$ to produce an activated active carbon substrate, and
   cooling the activated active carbon substrate in the reaction gas mixture atmosphere to a temperature of <200° C.

2. A process as set forth in claim 1, wherein the active carbon substrate is derived from carbon-bearing cokable materials.

3. A process as set forth in claim 1 wherein the gas or gas mixture used for contacting the active carbon substrate further comprises $N_2$.

4. A process as set forth in claim 1, wherein the heating operation is effected by introducing the active carbon substrate into an activation reactor which is preheated to activation temperature and is concluded when the active carbon substrate has reached a desired activity.

5. A process as set forth in claim 1, wherein the gas mixture used for activation of the heated active carbon substrate contains between 1 and 20% by volume of $NH_3$, between 10 and 60% by volume of $H_2O$ and between 5 and 50% by volume of $CO_2$.

6. A process as set forth in claim 5, wherein the gas mixture used for activation of the heated active carbon substrate contains between 1 and 10% by volume of $NH_3$, between 10 and 30% by volume of $H_2O$ and between 5 and 15% by volume of $CO_2$.

7. A process as set forth in claim 1, wherein activation is effected over a period of between 30 and 120 minutes.

8. A process as set forth in claim 1, wherein the active carbon substrate is an active carbon produced from at least one of coconut shells, pit coal, fruit stone shell, brown coal coke and polymers.

9. A process for producing active carbon with increased catalytic activity, said process comprising the following process steps:
   providing an active carbon substrate
   impregnating the active carbon substrate with ammonia water,
   heating the active carbon substrate to the activation temperature of 800 to 970° C. by contacting it with a reaction gas mixture which contains at least one of $CO_2$ and $H_2O$ to produce an activated active carbon substrate, and
   cooling the activated active carbon substrate in the reaction atmosphere to a temperature of <200° C.

10. A process as set forth in claim 9, wherein the active carbon substrate is derived from carbon-bearing cokable materials.

11. A process as set forth in claim 9, wherein the gas or gas mixture used for contacting the active carbon substrate further comprises $N_2$.

12. A process as set forth in claim 9, wherein the heating operation is effected by introducing the active carbon substrate into an activation reactor which is preheated to activation temperature and is concluded when the active carbon substrate has reached a desired activity.

13. A process as set forth in claim 9, wherein the gas mixture used for activation of the heated active carbon substrate contains between 1 and 20% by volume of $NH_3$, between 10 and 60% by volume of $H_2O$ and between 5 and 50% by volume of $CO_2$, preferably between 1 and 10% by volume of $NH_3$, between 10 and 30% by volume of $H_2O$ and between 5 and 15% by volume of $CO_2$.

14. A process as set forth in claim 13, wherein the gas mixture used for activation of the heated active carbon substrate contains between 1 and 10% by volume of $NH_3$, between 10 and 30% by volume of $H_2O$ and between 5 and 15% by volume of $CO_2$.

15. A process as set forth in claim 9, wherein activation is effected over a period of between 30 and 120 minutes.

16. A process as set forth in claim 9, wherein the active carbon substrate is an active carbon produced from at least one of coconut shells, pit coal, fruit stone shell, brown coal coke and polymers.

* * * * *